United States Patent
Yamazaki et al.

(10) Patent No.: US 10,732,153 B2
(45) Date of Patent: Aug. 4, 2020

(54) SEPARATION/PURIFICATION APPARATUS (71) Applicant: Shimadzu Corporation, Kyoto (JP)

(72) Inventors: Tomoyuki Yamazaki, Kyoto (JP); Yosuke Iwata, Kyoto (JP)

(73) Assignee: Shimadzu Corporation, Kyoto (JP)

( * ) Notice: Subject to any disclaimer, the term of this patent is extended or adjusted under 35 U.S.C. 154(b) by 258 days.

(21) Appl. No.: 15/751,500

(22) PCT Filed: Aug. 24, 2015

(86) PCT No.: PCT/JP2015/073702
§ 371 (c)(1),
(2) Date: Feb. 9, 2018

(87) PCT Pub. No.: WO2017/033256
PCT Pub. Date: Mar. 2, 2017

(65) Prior Publication Data
US 2018/0231510 A1    Aug. 16, 2018

(51) Int. Cl.
G01N 30/02    (2006.01)
G01N 30/84    (2006.01)
G01N 30/38    (2006.01)
G01N 30/46    (2006.01)
G01N 30/80    (2006.01)
G01N 30/82    (2006.01)
(Continued)

(52) U.S. Cl.
CPC ............. *G01N 30/38* (2013.01); *B01D 15/24* (2013.01); *G01N 30/26* (2013.01); *G01N 30/40* (2013.01);
(Continued)

(58) Field of Classification Search
CPC ...... G01N 30/26; G01N 30/80; G01N 30/466; G01N 30/82; G01N 2030/027;
(Continued)

(56) References Cited

U.S. PATENT DOCUMENTS

2009/0314716 A1 * 12/2009 Osaka .................... G01N 30/82
                                                       210/656
2010/0276350 A1   11/2010 Kono et al.
(Continued)

FOREIGN PATENT DOCUMENTS

CN       103423137 A       12/2013
EP         2365328 A1       9/2011
(Continued)

OTHER PUBLICATIONS

International Search Report dated Nov. 10, 2015 of corresponding International application No. PCT/JP2015/073702; 2 pgs.
(Continued)

Primary Examiner — Brandi N Hopkins
(74) Attorney, Agent, or Firm — Maier & Maier, PLLC (57) ABSTRACT A preparative purification apparatus capable of adjusting a mixing ratio of a mobile phase and an elution solvent contained in a solution to be collected. A liquid feeding unit which feeds an elution solvent to an inlet of a trap column; a flow path switching unit which selectively connects an outlet of the trap column to one of a waste liquid flow path or a recovery flow path; a liquid feed amount measurement unit; and a flow path control unit which performs a control such that the flow path switching unit is connected to the recovery flow path when the amount of the elution solvent fed to the trap column reaches a predetermined initial waste liquid amount, and thereafter, the flow path switching unit is connected to the waste liquid flow path at a timing of reaching a predetermined solution recovery amount.

11 Claims, 4 Drawing Sheets (51) Int. Cl.
  *G01N 30/26* (2006.01)
  *B01D 15/24* (2006.01)
  *G01N 30/40* (2006.01)
(52) U.S. Cl.
  CPC ........... *G01N 30/46* (2013.01); *G01N 30/466* (2013.01); *G01N 30/80* (2013.01); *G01N 30/82* (2013.01); *G01N 30/84* (2013.01); *G01N 2030/027* (2013.01); *G01N 2030/402* (2013.01); *G01N 2030/8411* (2013.01)
(58) Field of Classification Search
  CPC .. G01N 2030/841; G01N 30/46; G01N 30/40; G01N 30/84; G01N 30/38; G01N 2030/402; G01N 30/8627; G01N 30/8634; G01N 30/8631; B01D 15/24
  See application file for complete search history.

(56) References Cited

U.S. PATENT DOCUMENTS

| | | | | |
|---|---|---|---|---|
| 2010/0281958 | A1* | 11/2010 | Kono | B01D 15/203 73/61.53 |
| 2011/0198272 | A1* | 8/2011 | Yamazaki | G01N 30/08 210/96.1 |
| 2013/0309100 | A1 | 11/2013 | Yamazaki | |

FOREIGN PATENT DOCUMENTS

| | | |
|---|---|---|
| JP | 2003-149217 A | 5/2003 |
| JP | 2011-164049 A | 8/2011 |
| WO | 2009/044425 A1 | 4/2009 |

OTHER PUBLICATIONS

Written Opinion of the International Searching Authority dated Nov. 10, 2015 of corresponding International application No. PCT/JP2015/073702; 8 pgs.

International Preliminary Report on Patentability dated Feb. 27, 2018 in corresponding International application No. PCT/JP2015/073702; 6 pages.

Chinese Office Action dated Jun. 25, 2019, in connection with corresponding CN Application No. 201580082607.1 (21 pgs., including English translation).

Extended European Search Report dated Aug. 27, 2018, including a Supplementary European Search Report and the European Search Opinion, in connection with corresponding EP Application No. 15902227.6 (9 pgs.).

* cited by examiner

_SEPARATION/PURIFICATION APPARATUS_

The present invention relates to a preparative purification apparatus for separating and recovering one or more components contained in a solution, using a liquid chromatograph.

BACKGROUND

In a pharmaceutical field, a preparative purification system using a liquid chromatograph is used for the purpose of collecting samples for storing various compounds obtained by chemical synthesis as libraries or analyzing various compounds in detail. As such a preparative separation system, systems described in Patent Document 1 and 2 are known.

In the preparative purification systems described in Patent Documents 1 and 2, target components (compounds) in a sample solution are introduced into separate trap columns for each target component and captured once, by being temporally separated with a liquid chromatograph. Thereafter, a solvent (elution solvent) is allowed to flow through each trap column to elute the target component captured in the column, thereby collecting a solution containing the target component in a container (collection container), and each solution is subjected to evaporation and dryness process to remove the solvent, thereby recovering the target component as solid matter. By recovering the target component as solid matter in this way, the storage and transportation are easily performed.

The evaporation and dryness process is generally carried out by a method such as heating or vacuum centrifugation of the recovered solution. The solution collected in the recovery container contains the elution solvent and a mobile phase used for capture in a trap column. Although an organic solvent is usually used for the mobile phase, in some cases, water or a solution containing water as a main component may be used. When moisture is contained in the mobile phase, since it takes time for evaporation of water, there is a need for several hours to one day in the evaporation and dryness process.

On the other hand, when the recovered target component is used, the solidified target component may be dissolved in the solvent again and used in a solution form. In such a case, it is possible to drastically shorten the time required for the recovery process of the target component, by recovering and using the target component as a solution, without performing the evaporation and dryness process in the preparative purification system.

Patent Document 1: JP-A-2003-149217
Patent Document 2: International Publication WO 2009-044425

SUMMARY

In the case of recovering the target component in the above-mentioned preparative purification system, when the elution solvent is fed to the trap column, the elution solvent and the mobile phase are suspended in the vicinity of a boundary thereof. Since the target component is also eluted in the suspension, in order to recover the target component captured in the trap column as much as possible, the suspension is also included and collected. Therefore, the elution solvent and the mobile phase are mixed with each other in the recovered solution. When a process such as analysis of a target component is performed using the recovered solution, in a case where a mixing ratio of the mobile phase and the elution solvent is varied, there is a problem that an accurate analysis is not performed or a rapid process is not performed.

An object to be solved by the invention is to provide a preparative purification apparatus capable of adjusting a mixing ratio of a mobile phase and an elution solvent contained in a solution to be collected.

In order to solve the above problems, according to an aspect of the invention, there is provided a preparative purification apparatus which causes a solution eluted from a liquid chromatograph to flow through a trap column to capture a target component contained in the solution in the trap column, and thereafter, causes a elution solvent different from a mobile phase of the liquid chromatograph to flow through the trap column to elute the target component from the trap column, the apparatus including:

a) a liquid feeding unit which feeds the elution solvent to an inlet of the trap column;

b) a flow path switching unit which selectively connects an outlet of the trap column to one of a waste liquid flow path and a recovery flow path;

c) a liquid feed amount measurement unit which measures an amount of the elution solvent fed to the trap column by the liquid feeding unit; and d) a flow path control unit which controls the flow path switching unit to connect the outlet of the trap column to the recovery flow path at a timing when the amount of the elution solvent fed to the trap column reaches a predetermined initial waste liquid amount, and thereafter, to connect the outlet of the trap column to the waste liquid flow path at a timing of reaching a predetermined solution recovery amount.

Further, according to another aspect of the invention made to solve the above-mentioned problems, there is provided a preparative purification method in which a solution eluted from a liquid chromatograph is caused to flow through a trap column to capture a target component contained in the solution in the trap column, and thereafter, a elution solvent different from a mobile phase of the liquid chromatograph is caused to flow through the trap column to elute the target component from the trap column, the method including:

a) feeding the elution solvent to an inlet of the trap column;

b) measuring an amount of the elution solvent fed to the trap column; and c) connecting the outlet of the trap column to the recovery flow path at a timing when the amount of the elution solvent fed to the trap column reaches a predetermined initial waste liquid amount, and thereafter, connecting the outlet of the trap column to the waste liquid flow path at a timing of reaching a predetermined solution recovery amount.

In the preparative purification apparatus according to the invention, the target component is captured in the adsorbent in the trap column, the elution solvent is fed by the liquid feeding unit in a state in which the mobile phase is accumulated in the trap column, and the elution solvent is sent to the inlet of the trap column. Thus, the mobile phase is extruded from the exit of the trap column. At this time, the mobile phase extruded from the trap column flows to the waste liquid flow path, as an initial waste liquid. When the amount of the elution solvent measured by the liquid feed amount measurement unit reaches a predetermined initial waste liquid amount, the flow path control unit controls the flow path switching unit to cause the liquid flowing out of the exit of the trap column to start to flow into the recovery flow path. When the mobile phase or the turbid liquid of the mobile phase and the elution solvent (or the suspension when the mobile phase is an aqueous system) still remains in the trap column at the time of switching the flow path, the mobile phase or the turbid liquid are sent to the recovery flow path. Thereafter, when all of the mobile phase or the turbid liquid in the trap column is discharged, the solution discharged from the trap column is switched to the elution solvent. When the amount of the elution solvent fed to the trap column reaches the predetermined solution recovery amount, the flow path control unit controls the flow path switching unit to cause the elution solvent (later waste liquid) discharged from the trap column to flow through the waste liquid flow path. This makes it possible to set the ratio of the mobile phase and the elution solvent in a predetermined amount (solution recovery amount) recovered from the trap column to a desired value.

A solvent having a boiling point lower than that of water, such as acetonitrile and dichloromethane, can be suitably used as the elution solvent of the preparative purification apparatus. By using such a solvent, it is possible to perform the process in the case of concentrating the recovered solution in a short time.

In the above preparative purification apparatus, the flow path control unit may be configured to control the flow path switching unit so that the mixing ratios in the recovered solutions are all constant.

In the case of collecting and concentrating a plurality of solutions, since the time required for the concentration process varies depending on the mixing ratios in the collected solutions, it was necessary to perform a concentration process for each solution. In addition, in order to concentrate all the solutions at the same time, it is necessary to perform the concentration process after adjusting the respective solutions so that the mixing ratios in the solutions become constant, which is troublesome.

According to the preparative purification apparatus according to the invention, since all the mixing ratios in the recovered solutions are constant, it is possible to process a plurality of solutions under uniform conditions when these solutions are concentrated.

According to the preparative purification apparatus of the invention, the mixing ratio of the mobile phase and the elution solvent can be adjusted, by adjusting the recovery amount of the mobile phase and the elution solvent to be collected.

Embodiments of the invention will be described below with reference to the drawings.

Figure 1:
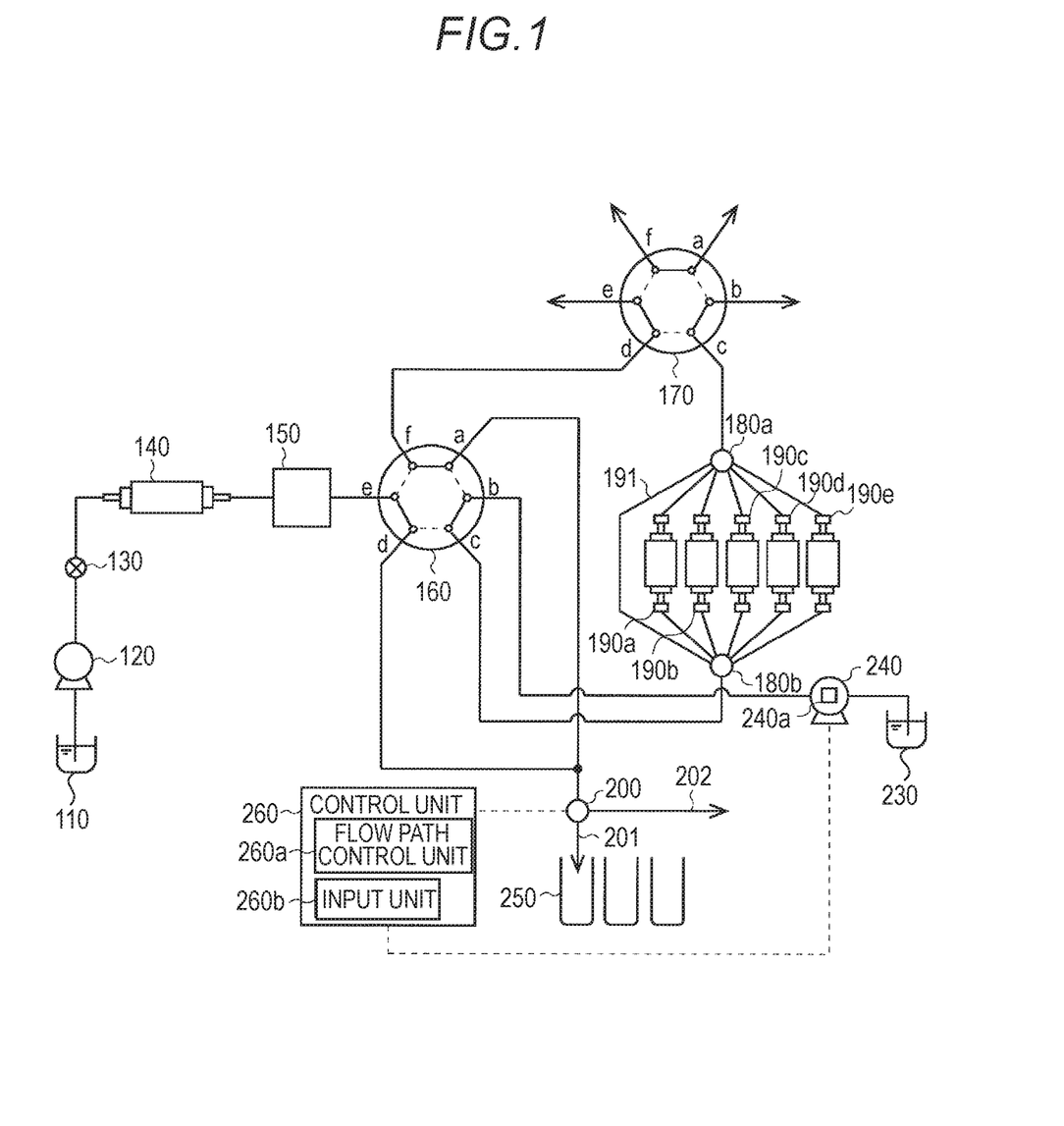
FIG. 1 is a schematic configuration diagram of a preparative purification apparatus according to a first embodiment of the invention.

FIG. 1 is a schematic configuration diagram of a preparative purification apparatus according to a first embodiment of the invention. The preparative purification apparatus includes a mobile phase container 110 which contains a mobile phase, a mobile phase liquid feeding pump 120 which delivers the mobile phase, an automatic sample injector 130 which injects a sample into the mobile phase, a separation column 140 which separates a target component in the sample, a detector 150 which detects the separated target component, a first flow path switching valve 160, a second flow path switching valve 170, a first column switching valve 180a, a second column switching valve 180b, a trap column 190 which captures a target component, a recovery/waste liquid switching valve 200, a recovery flow path 201, a waste liquid flow path 202, an eluate container 230, an eluate feeding pump 240, a recovery container 250, and a control unit 260.

The separation column 140 has an inlet end connected to the automatic sample injector 130, and an outlet end connected to the detector 150. An outlet end of the detector 150 is connected to a port e of the first flow path switching valve 160. Various detectors for liquid chromatography such as an absorbance detector and a differential refractive index detector can be used as the detector 150.

The first and second flow path switching valves 160 and 170 have ports a to f, and by selectively connecting one of the flow paths indicated by the solid line and broken line in FIG. 1, it is possible to allow each port to communicate with either one of the two adjacent ports.

The second flow path switching valve 170 is connected to the trap column via the first column switching valve 180a. The first column switching valve 180a selectively connects the port c of the second flow path switching valve 170 to one of the trap columns 190a to 190e and the drain flow path 191 to which no trap column is connected. The first flow path switching valve 160 is connected to the trap column via the second column switching valve 180b, and the second column switching valve 180b selectively connects the port c of the first flow path switching valve 160 to the trap columns 190a to 190e and the drain flow path 191. The first and second column switching valves 180a and 180b are synchronized, and when one is switched, the other valve also switches to the same trap columns 190a to 190e or the drain flow path 191.

The recovery/waste liquid switching valve 200 is connected to the trap column via the first flow path switching valve 160, and selectively connects the trap column 190 to either one of a recovery flow path 201 which allows a solution to flow through the recovery container 250 and a waste liquid flow path 202 for discarding the solution.

The control unit 260 including a CPU and the like has a flow path control unit 260a and an input unit 260b, and is electrically connected to the liquid feed amount measurement unit 240a and the recovery/waste liquid switching valve 200. The flow path control unit 260a controls the recovery/waste liquid switching valve 200 in accordance with a preset program. Further, the initial waste liquid amount and the solution recovery amount from the input unit 260b can be set, respectively, and these set values are used for determining the switching timing of the recovery/waste liquid switching valve 200 in the flow path control unit 260a.

An eluate corresponding to the target component captured in the trap column 190 is contained in the eluate container 230. The recovery container 250 has a plurality of containers which are set in accordance with the type of target components to be recovered.

The eluate feeding pump 240 has the liquid feed amount measurement unit 240a. The liquid feed amount measurement unit 240a is electrically connected to the control unit 260, measures the amount of eluate fed from the eluate feeding pump 240, and transmits the measurement data to the control unit 260.

Further, although containers in which a cleaning liquid or a diluting liquid (not illustrated) are stored or a liquid feeding pump for feeding the cleaning liquid or the diluting liquid are connected to the ports a, b, e and f of the second flow path switching valve 170, the description thereof will not be provided in the present embodiment.

Next, the operation of the preparative purification apparatus will be described. The operation of the preparative purification apparatus can be roughly divided into a capturing process and an elution process. First, the capturing process will be described.

In this embodiment, pure water is used as a mobile phase and acetonitrile $CH_3CN$) is used as an elution solvent. First, after the user inputs the initial waste liquid amount and the solution recovery amount from the input unit 260b, the user starts the preparative purification process.

At the beginning, the mobile phase contained in the mobile phase container 110 is fed by the mobile phase liquid feed pump 120 at a constant flow rate. The sample containing the target component is injected into the mobile phase by the automatic sample injector 130, and transported to the separation column 140. In the separation column 140, the target component contained in the sample is temporally separated, and the target component is detected by the detector 150.

In the capturing process, the first and second flow path switching valves 160 and 170 are set in flow paths indicated by broken lines of FIG. 1. The sample having passed through the detector 150 flows to the first column switching valve 180a, via the port e and the port f of the first flow path switching valve 160, and via the port d and the port c of the second flow path switching valve 170. Immediately after the mobile phase liquid feeding pump 120 starts to feed liquid, since the target component is not contained in the mobile phase flowing into the first column switching valve 180a, the first column switching valve 180a is connected to the drain flow path 191. The mobile phase flows from the recovery/waste liquid switching valve 200 to the waste liquid flow path 202 via the port c and the port d of the first flow path switching valve 160, and is discarded.

When a predetermined time has elapsed from the time when the target component is detected in the detector 150, the target component flows into the first column switching valve 180a. At this timing, the first column switching valve 180a switches the flow path to be connected from the drain flow path 191 to the trap column 190a, thereby capturing the target component in the trap column 190a. The mobile phase having passed through the trap column 190a flows from the recovery/waste liquid switching valve 200 to the waste liquid flow path 202 via the port c and the port d of the first flow path switching valve 160, and is discarded. Every time the target component detected by the detector 150 is switched, the first column switching valve 180a switches the flow path to capture the target components in the different trap columns for each type of target component.

When all the target components are collected in any one of the trap columns 190a to 190e, the preparative purification apparatus stops the mobile phase liquid feeding pump 120. At this time point, all the trap columns 190a to 190e are filled with the mobile phase.

Next, an operation of recovering the target component captured in the trap column 190 to the recovery container 250 will be described.

First, the first flow path switching valve 160 is switched to the flow path indicated by the solid line in FIG. 1. The eluate feeding pump 240 feeds the elution solvent contained in the eluate container 230 to the trap column 190. The elution solvent passes through the port b and the port c of the first flow path switching valve 160, and flows from the second column switching valve 180b to the inlet of the trap column 190a to extrude the mobile phase filled in the trap column 190a. The mobile phase discharged from the outlet of the trap column 190a passes through the port c and the port d of the second flow path switching valve 170, flows through the port f and the port a of the first flow path switching valve 160, and flows into the recovery/waste liquid switching valve 200. Since the recovery/waste liquid switching valve 200 is connected to the waste liquid flow path 202 in the same manner as in the capturing process, the mobile phase is discarded as the initial waste liquid through the waste liquid flow path 202.

Figure 2:
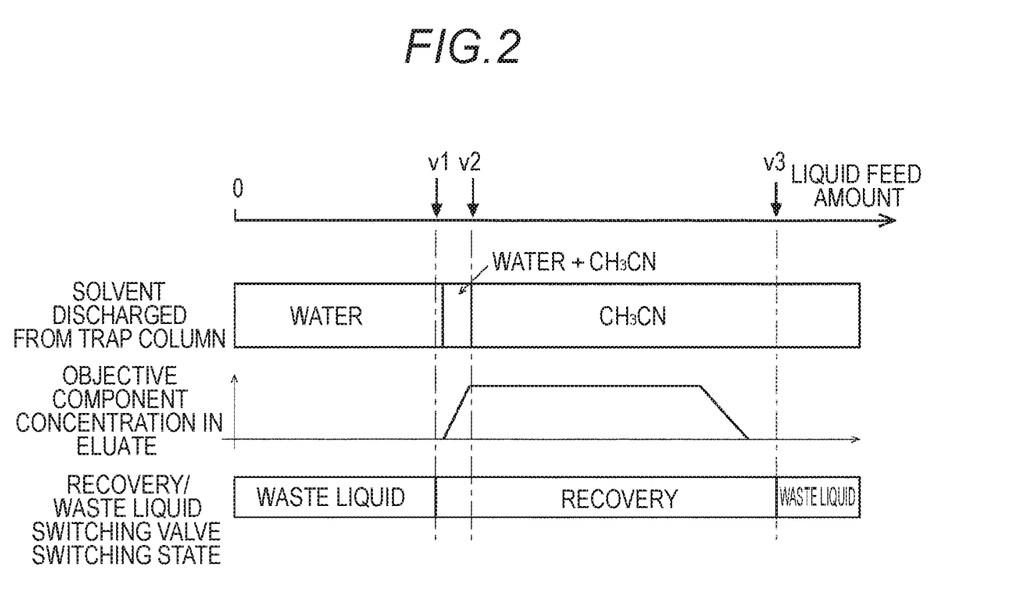
FIG. 2 is a diagram illustrating changes in a solvent and a target component in an eluate from a trap column.
Figure 3A:
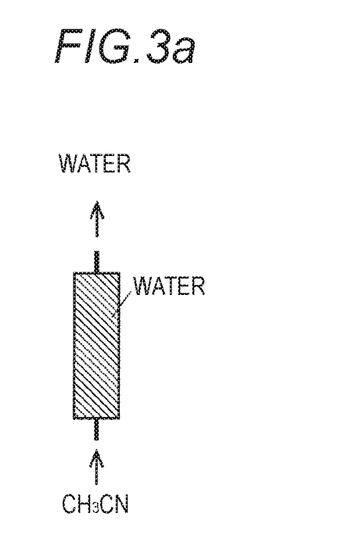
FIG. 3a is a schematic diagram illustrating the solvent in the trap column.
Figure 3B:
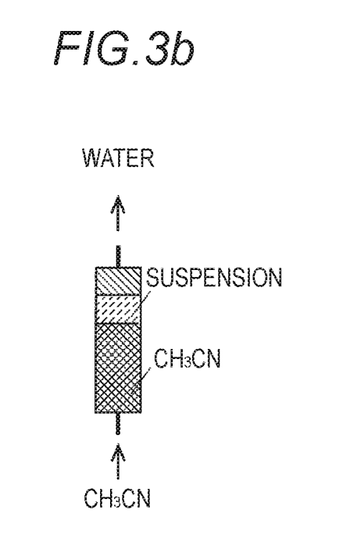
FIG. 3b is a schematic diagram illustrating a change in the solvent in the trap column.
Figure 3C:
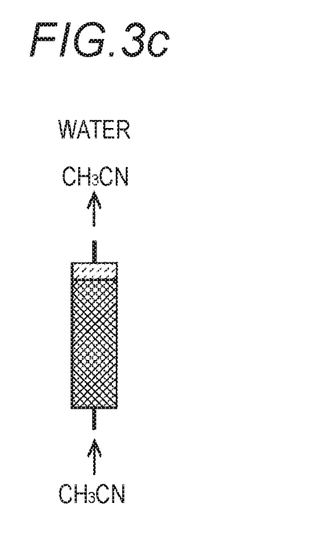
FIG. 3c is a schematic diagram illustrating a change in the solvent in the trap column.
Figure 3D:
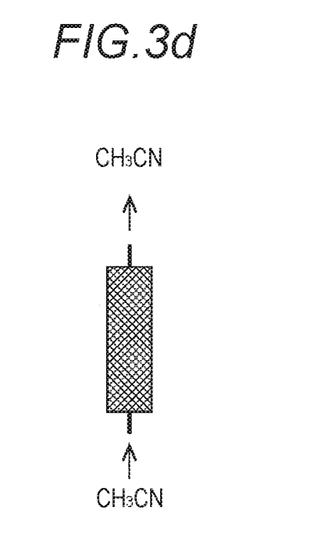
FIG. 3d is a schematic diagram illustrating a change in the solvent in the trap column.

The operation of the flow path control unit 260a will be described with reference to FIGS. 2 and 3a to 3d. The flow path control unit 260a connects the recovery/waste liquid switching valve 200 to the waste liquid flow path 202 until the measured value of the liquid feed amount measurement unit 240a becomes an initial waste liquid amount v1. At this time period, as illustrated in FIGS. 2 and 3a, since the solvent discharged from the trap column 190a is water which is the mobile phase, the target component is not contained. Further, when the measured value of the liquid feed amount measurement unit 240a reaches the initial waste liquid amount v1, the flow path control unit 260a switches the recovery/waste liquid switching valve 200 to the recovery flow path 201 (FIG. 3b). As a result, the mobile phase starts to be recovered into the recovery container 250. Thereafter, the elution solvent and the turbid liquid of the mobile phase start to be gradually discharged from the trap column 190a (FIG. 3c), and the solvent discharged at a liquid feed amount v2 of the elution solvent becomes only the elution solvent (FIG. 3d). Further, after all the target components are eluted, the flow path control unit 260a switches the recovery/waste liquid switching valve 200 to the waste liquid flow path 202 at a solution recovery amount v3, discards the elution solvent as the later waste liquid, and thereafter, the recovery process of the target component from the trap column 190a is terminated.

Thereafter, the first and second column switching valves 180a and 180b are switched to the next trap column 190b, the recovery container 250 is also switched to a new container, and the recovery of the next target component is performed in the same procedure. At this time, by setting the initial waste liquid amount v1 and the solution recovery amount v3 to the same values as those of the trap column 190a, the solution is recovered with the same mixing ratio as that of the trap column 190a. For other trap columns, the target components are recovered by the same procedure, and when the recovery of all the trap columns is terminated, the process of the preparative purification apparatus is completed.

Thereafter, in the case of recovering the target component using the same sample, it is possible to recover a solution with the same mixing ratio, using the same values of the initial waste liquid amount and the solution recovery amount as in the above process.

In this way, in the preparative purification apparatus according to the above-described embodiment, it is possible to constantly adjust the mixing ratios in the recovered solutions in all the recovery containers 250, by constantly setting the recovery amounts of the mobile phase and the eluate.

Figure 4:
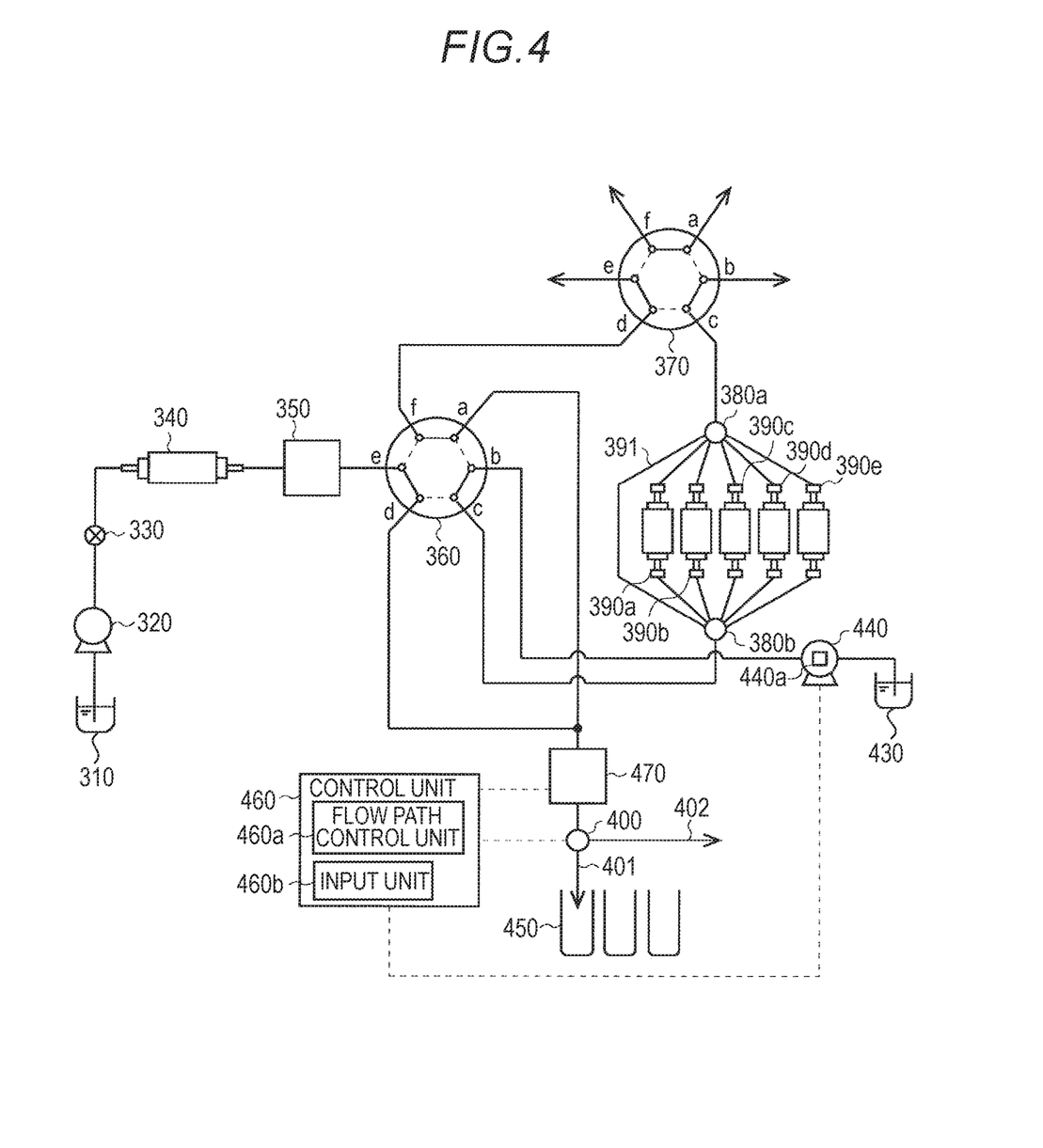
FIG. 4 is a schematic configuration diagram of a preparative purification apparatus according to a second embodiment of the invention.

Next, a preparative purification apparatus according to a second embodiment of the invention will be described. FIG. 4 illustrates a schematic configuration diagram of the preparative purification apparatus according to the second embodiment. In the second embodiment, the configuration is the same as that of the first embodiment except that a preparative detector 470 is provided before the recovery/waste liquid switching valve 400. Also, regarding the operation of the preparative purification apparatus, since the capturing process is the same as in the first embodiment, the explanation will not be provided, and the operation of the preparative detector 470 in the elution process will be mainly described.

An eluate feeding pump 440 delivers the eluate contained in an eluate container 430 to the trap column 390. The eluate flows from a second column switching valve 380b to an inlet of a trap column 390a via a port b and a port c of a first flow path switching valve 360, and extrudes the mobile phase filled in a trap column 390a. The mobile phase discharged from the outlet of the trap column 390 passes through the detector 470 via a port c and a port d of a second flow path switching valve 370, and via the port f and then the port a of the first flow path switching valve 360, and flows into the recovery/waste liquid switching valve 400. Since the recovery/waste liquid switching valve 400 is connected to the waste liquid flow path 402 similarly to the capturing process, the mobile phase is discarded through the waste liquid flow path 402.

The flow path control unit 460a connects the recovery/waste liquid switching valve 400 to the waste liquid flow path 402, until the target component is detected by the preparative detector 470. When the suspension of the elution solvent and the mobile phase begin to be contained in the solvent discharged from the trap column 390a, the target component is detected by the preparative detector 470, and the detection result is transmitted to the flow path control unit 460a. When the target component is detected, the flow path control unit 460a switches the recovery/waste liquid switching valve 400 to the recovery flow path 401, and starts the recovery of the eluate into the recovery container 450.

Thereafter, the elution solvent begins to be discharged from the trap column 390a at the liquid feed amount v2 of the elution solvent. Further, at the timing when all the target components are eluted and the target components are no longer detected in the preparative detector 470, the flow path control unit 460a switches the recovery/waste liquid switching valve 400 to the waste liquid flow path 402, and terminates the recovery of the target component from the trap column 390a.

In the preparative purification apparatus according to the second embodiment, the recovery/waste liquid switching valve 400 is switched in accordance with the measurement value of the preparative detector 470. In this case, by arbitrarily setting the flow rate and time of the eluate feeding pump, it is possible to adjust the recovery amount of the mobile phase, the elution solvent and the target component.

In the aforementioned embodiments, although the user inputs the initial waste liquid amount and the eluate recovery amount, respectively, a configuration in which the recovery start time and the recovery end time are input may be adopted. In this case, it is possible for the user to arbitrarily set the mixing ratio of the solvents, using the eluate feeding pump having a constant liquid feed amount.

Although the liquid feed amount measurement unit is configured to be provided in the eluate feeding pump, the liquid feed amount measurement unit may be provided at any position other than the waste liquid flow path among the flow paths used in the preparative process. Although the number of trap columns is set to 5 in the aforementioned embodiments, the number may be 5 or more and may be less than 5. By providing a large number of trap columns, it is possible to sort out the large number of target components, respectively.

REFERENCE SIGNS LIST 110, 310 . . . mobile phase container
120, 320 . . . mobile phase liquid feeding pump
130, 330 . . . automatic sample injector
140, 340 . . . separation column
150, 350 . . . detector
160, 360 . . . first flow path switching valve
170, 370 . . . second flow path switching valve
180a, 380a . . . first column switching valve
180b, 380b . . . second column switching valve
190, 390 . . . trap column
191, 391 . . . drain flow path
200, 400 . . . recovery/waste liquid switching valve
201, 401 . . . recovery flow path
202, 402 . . . waste liquid flow path
230, 430 . . . eluate container
240, 440 . . . eluate feeding pump
240a, 440a . . . liquid feed amount measurement unit
250, 450 . . . recovery container
260, 460 . . . control unit
260a, 460a . . . flow path control unit
260b, 460b . . . input unit
470 . . . preparatory detector

The invention claimed is:

1. A preparative purification apparatus which causes a solution eluted from a liquid chromatograph to flow through a trap column to capture a target component contained in the solution in the trap column, and thereafter, causes an elution solvent different from a mobile phase of the liquid chromatograph to flow through the trap column to elute the target component from the trap column, the apparatus comprising:
   a) a liquid feeding unit which feeds the elution solvent to an inlet of the trap column;
   b) a flow path switching unit which selectively connects an outlet of the trap column to one of a waste liquid flow path and a recovery flow path;
   c) a liquid feed amount measurement unit which measures an amount of the elution solvent fed to the trap column by the liquid feeding unit; and
   d) a flow path control unit which enables recovery of a turbid liquid of the mobile phase and the elution solvent including the target component, and thereafter, recovery of the elution solvent including the target component by controlling the flow path switching unit to connect the outlet of the trap column to the recovery flow path at a timing when the amount of the elution solvent fed to the trap column, which is measured by the liquid feed amount measurement unit, reaches a predetermined initial waste liquid amount, and thereafter, to connect the outlet of the trap column to the waste liquid flow path at a timing when the amount of the elution solvent fed to the trap column, which is measured by the liquid feed amount measurement unit, reaches a predetermined solution recovery amount, wherein the flow path control unit is configured to control the flow path switching unit so that the mobile phase and the elution solvent in a mixing ratio determined by the predetermined initial waste liquid amount and the predetermined solution recovery amount composed of the turbid liquid of the mobile phase and the elution solvent including the target component first recovered as well as the elution solvent including the target component thereafter recovered, are recovered from the recovery flow path without a unit of performing an evaporation and dryness process.

2. The preparative purification apparatus according to claim 1, wherein the apparatus is configured for use with an elution solvent that has a boiling point lower than that of water.

3. The preparative purification apparatus according to claim 2 further comprising a plurality of the trap columns, wherein each trap column is configured to capture a type of target component to enable sequential elution and recovery of each type of target component into individual recovery containers, and the flow path control unit is configured to make the mixing ratio of the mobile phase and the elution solvent recovered for each type of target component captured in each trap column constant, by setting the predetermined initial waste liquid amount and the predetermined solution recovery amount to the same values for the types of the target components captured in the respective trap columns.

4. The preparative purification apparatus according to claim 2, wherein, the flow path control unit is configured to enable setting of a constant mixing ratio of the recovered mobile phase and the elution solvent, by setting the predetermined initial waste liquid amount and the predetermined solution recovery amount to the same values.

5. The preparative purification apparatus according to claim 1 further comprising a plurality of the trap columns, wherein each trap column is configured to capture a type of target component to enable sequential elution and recovery of each type of target component into individual recovery containers, and the flow path control unit is configured to make the mixing ratio of the mobile phase and the elution solvent recovered for each type of target component captured in each trap column constant, by setting the predetermined initial waste liquid amount and the predetermined solution recovery amount to the same values for the types of the target components captured in the respective trap columns.

6. The preparative purification apparatus according to claim 5, wherein, the flow path control unit is configured to enable setting of a constant mixing ratio of the recovered mobile phase and the elution solvent, by setting the predetermined initial waste liquid amount and the predetermined solution recovery amount to the same values.

7. The preparative purification apparatus according to claim 1, wherein the flow path control unit is configured to enable setting of a constant mixing ratio of the recovered mobile phase and the elution solvent, by setting the predetermined initial waste liquid amount and the predetermined solution recovery amount to the same values.

8. A preparative purification method in which a solution eluted from a liquid chromatograph is caused to flow through a trap column to capture a target component contained in the solution in the trap column, and thereafter, an elution solvent different from a mobile phase of the liquid chromatograph is caused to flow through the trap column to elute the target component from the trap column, the method comprising:
    a) feeding the elution solvent to an inlet of the trap column;
    b) measuring an amount of the elution solvent fed to the trap column; and
    c) recovering a turbid liquid of the mobile phase and the elution solvent including the target component, and thereafter, recovering the elution solvent including the target component by connecting the outlet of the trap column to a recovery flow path at a timing when the measured amount of the elution solvent fed to the trap column reaches a predetermined initial waste liquid amount, and thereafter, connecting the outlet of the trap column to the waste liquid flow path at a timing when the measured amount of the elution solvent fed to the trap column reaches a predetermined solution recovery amount, so that the mobile phase and the elution solvent are recovered from the recovery flow path in a mixing ratio determined by the predetermined initial waste liquid amount and the predetermined solution recovery amount,
    wherein the mobile phase and the elution solvent in the mixing ratio, composed of the turbid liquid of the mobile phase and the elution solvent including the target component first recovered as well as the elution solvent including the target component thereafter recovered, are recovered from the recovery flow path without performing an evaporation and dryness process.

9. The preparative purification method according to claim 8, further comprising capturing the target components in a plurality of trap columns, and sequentially eluting and recovering the captured target components into individual recovery containers by setting the predetermined initial waste liquid amount and the predetermined solution recovery amount to the same values for types of the target components captured in respective trap columns, wherein the mixing ratio of the mobile phase and the elution solvent recovered for each type of target component captured in each trap column is made constant.

10. The preparative purification method according to claim 9, wherein, when the target component is recovered using the same solution, the predetermined initial waste liquid amount and the predetermined solution recovery amount are set to the same values to make the mixing ratio of the recovered mobile phase and the elution solvent constant.

11. The preparative purification method according to claim 8, wherein, when the target component is recovered using the same solution, the predetermined initial waste liquid amount and the predetermined solution recovery amount are set to the same values to make the mixing ratio of the recovered mobile phase and the elution solvent constant.

* * * * *